United States Patent [19]

Dawes et al.

[11] 3,862,170
[45] Jan. 21, 1975

[54] TRIAZOLYLPHOSPHORIC ACID ESTERS

[75] Inventors: Dag Dawes, Pratteln; Beat Boehner, Binningen, both of Switzerland

[73] Assignee: Ciba-Geigy Corporation, Ardsley, N.Y.

[22] Filed: Oct. 19, 1971

[21] Appl. No.: 190,674

[30] Foreign Application Priority Data
Oct. 22, 1970 Switzerland.................... 15609/70
Sept. 15, 1971 Switzerland.................... 13472/70

[52] U.S. Cl. ............................ 260/308 R, 424/200
[51] Int. Cl.............................................. C07d 55/06
[58] Field of Search................................ 260/308 R

[56] References Cited
UNITED STATES PATENTS
3,216,894  11/1965  Lorenz et al.................... 260/308 X
3,686,200  8/1972  Scherer et al.................... 260/308 R
3,689,500  9/1972  Bohner et al. ................... 260/308 R FOREIGN PATENTS OR APPLICATIONS
713,278  11/1954  Great Britain ................ 260/308 R
1,549,674  11/1968  France ........................... 260/308 R Primary Examiner—Joseph A. Narcavage
Attorney, Agent, or Firm—Harry Falber; Frederick H. Rabin

[57] ABSTRACT

Compounds of the formula

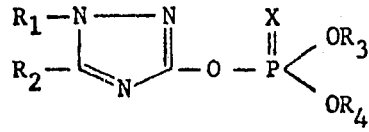

wherein
R₁ represents a lower alkyl or cycloalkyl radical,
R₂ represents hydrogen, a lower alkyl radical, or the phenyl radical,
R₃ and
R₄ each represent, independently of each other, a lower alkyl radical, and
X represents oxygen or sulphur,
their manufacture and their use for the control of insects, nematodes, members of the order Acarina and phytopathogenic fungi.

7 Claims, No Drawings

TRIAZOLYLPHOSPHORIC ACID ESTERS

The present invention relates to new triazolylphosphoric acid esters, to processes for their production, and to the use thereof for pest control.

The new triazolylphosphoric acid esters correspond to the formula:

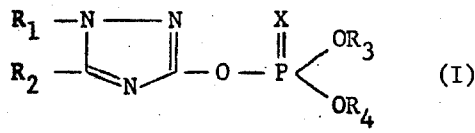 (I)

wherein
R₁ represents a lower alkyl or cycloalkyl radical,
R₂ represents hydrogen, a lower alkyl radical, or the phenyl radical,
R₃ and
R₄ each represent, independently of each other, a lower alkyl radical, and
X represents oxygen or sulphur.

By lower alkyl radicals R₁ and R₂ in formula I are meant such having 1 to 6 carbon atoms, such as, e.g. the methyl, ethyl, n-propyl, and isopropyl radical, as well as the n-butyl, isobutyl, sec.butyl, n-pentyl, and n-hexyl radical, and their respective isomers. A cycloalkyl radical R₁ contains 3 to 6 carbon atoms; the cyclopentyl and cyclohexyl radicals are preferred. The symbols R₃ and R₄ represent straight-chain or branched alkyl radicals having 1 to 4 carbon atoms, which can be identical or different.

Particularly preferred are the compounds of the formula:

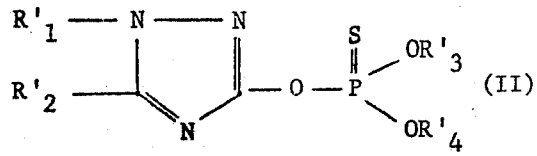 (II)

wherein R'₁ and R'₂ represent straight-chain or branched alkyl radicals having 1 to 6 carbon atoms, and R'₃ and R'₄ represent the methyl or ethyl radical.

The new triazolylphosphoric acid esters of formula I are produced according to the invention by
a. reacting a hydroxytriazole of the formula

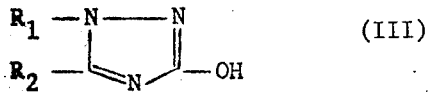 (III)

with a phosphoric acid halide of the formula

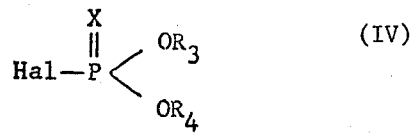 (IV)

in the presence of an acid-binding agent; or
b. causing a salt of a hydroxytriazole of formula III to react with a phosphoric acid halide of formula IV. In formulae II and IV, the symbols R₁ to R₄ and X have the meanings given under formula I; Hal stands for a halogen atom, particularly a chlorine or bromine atom.

Salts of hydroxytriazoles of formula III suitable for the process according to the invention are, in particular, the alkali metal salts; also applicable however are, for example, salts of monovalent heavy metals Suitable as acid-binding agents are, e.g., the following bases: tertiary amines such as triethylamine, dimethylaniline, pyridine, pyridine bases, inorganic bases such as hydroxides and carbonates of alkali metals and alkaline-earth metals, preferably sodium and potassium carbonate.

It is advisable that the reactions be carried out in solvents or diluents which are inert to the reactants. The following are, for example, suitable for this purpose: aromatic hydrocarbons such as benzene, toluene; benzines, halogenated hydrocarbons, chlorobenzene, polychlorobenzenes, bromobenzene, chlorinated alkanes having 1 to 3 carbon atoms, ethers such as dioxane, tetrahydrofuran; esters such as ethyl acetate; ketones such as methyl ethyl ketone, diethyl ketone.

The starting materials of formula III are in some cases known compounds which can be produced by processes known per se. The compounds are obtained by the reaction of a correspondingly substituted semicarbazide with orthocarboxylic acid alkyl ester, e.g. orthoformic acid ethyl ester; or by the acylation firstly of a correspondingly substituted semicarbazide, and subsequent ring closure under alkaline conditions (cp. e.g. Chem. Ber. 56, 1797).

The active substances of formula I are suitable for the control of insects, members of the order acarina, nematodes and phytopathogenic fungi.

They are effective, in particular, against all development stages such as, e.g. eggs, larvae and pupae of insects and members of the order acarina, such as mites and ticks.

The compounds of formula I can be used, for example, to combat the following insects or members of the order acarina:

Insects of the families:
| | |
|---|---|
| Tettigonidae | Tenebrionidae |
| Gryllidae | Chrysomelidae |
| Gryllotalpidae | Bruchidae |
| Blattidae | Tineidae |
| Peduviidae | Noctindae |
| Phyrrhocoriae | Lymantriidae |
| Cimicidae | Pyralidae |
| Delphacidae | Culicidae |
| Aphididae | Tipulidae |
| Diaspididae | Stomoxydae |
| Pseudococcidae | Trypetidae |
| Scarabaeidae | Muscidae |
| Dermestidae | Calliphoridae |
| Coccinellidae | Pulicidae | as well as Acarides of the families:
Ixodidae
Argasidae
Tetranychidae
Dermanyssidae.

The insecticidal or acaricidal action can be substantially broadened and adapted to suit the given circumstances by the addition of other insecticides and/or acaricides. Suitable additives are, amongst others, e.g. the following active substances:
Bis-0,0-diethylphosphoric acid anhydride (TEPP)
Dimethyl-(2,2,2-trichloro-1-hydroxyethyl)-phosphonate (TRICHLOROFON)
1,2-dibromo-2,2-dichloroethyldimethylphosphate (NALED)
2,2-dichlorovinyldimethylphosphate (DICHLORVOS)
2-methoxycarbamyl-1-methylvinyldimethylphosphate (MEVINPHOS)
Dimethyl-1-methyl-2-(methylcarbamoyl)-vinylphosphate cis (MONOCROTOPHOS)
3-(dimethoxyphosphinyloxy)-N,N-dimethyl-cis-crotonamide (DICROTOPHOS)

2-chloro-2-diethylcarbamoyl-1-methylvinyldimethylphosphate (PHOSPHAMIDON)
0,0-diethyl-0(or S)-2-(ethylthio)-ethylthiophosphate (DEMETON)
S-ethylthioethyl-0,0-dimethyl-dithiophosphate (THIOMETON)
0,0-diethyl-S-ethylmercaptomethyldithiophosphate (PHORATE)
0,0-diethyl-S-2-ethylthio)ethyldithiophosphate (DISULFOTON)
0,0-dimethyl-S-2-(ethylsulphinyl)ethylthiophosphate (OXYDEMETONMETHYL)
0,0-dimethyl-S-(1,2-dicarbethoxyethyldithiophosphate (MALATHION)
0,0,0,0-tetraethyl-S,S'-methylene-bis-dithiophosphate (ETHION)
0-ethyl-S,S-dipropyldithiophosphate
0,0-dimethyl-S-(N-methyl-N-formylcarbamoylmethyl)-dithiophosphate (FORMOTHION)
0,0-dimethyl-S-(N-methylcarbamoylmethyl)dithiophosphate (DIMETHOATE)
0,0-dimethyl-0-p-nitrophenylthiophosphate (PARATHION-METHYL)
0,0-diethyl-0-p-nitrophenylthiophosphate (PARATHION)
0-ethyl-0-p-nitrophenylphenylthiophosphate (EPN)
0,0-dimethyl-0-(4-nitro-m-tolyl)thiophosphate (FENITROTHION)
0,0-dimethyl-0-2,4-5-trichlorphenylthiophosphate (RONNEL)
0-ethyl-0,2,4,5-trichlorphenylethylthiophosphate (TRICHLORONATE)
0,0-dimethyl-0-2,5-dichlor-4-bromphenylthiophosphate (BROMOPHOS)
0,0-dimethyl-0-(2,5-dichlor-4-jodphenyl)-thiophosphate (JODOFENPHOS)
4-tert. butyl-2-chlorphenyl-N-methyl-0-methylamidophosphate (CRUFOMATE)
0,0-dimethyl-0-(3-methyl-4-methylmercaptophenyl)-thiophosphate (FENTHION)
Isopropylamino-0-ethyl-0-(4-methylmercapto-3-methylphenyl)-phosphate
0,0-diethyl-0-p-(methylsulphinyl)phenyl-thiophosphate (FENSULFOTHION)
0-p-(dimethylsulfamido)phenyl 0,0-dimethylthiophosphate (FAMPHUR) 0,0,0',0'-tetramethyl-0,0'-thiodi-p-phenylenthiophosphate
0-ethyl-S-henyl-ethyldithiophosphate
0,0-dimethyl-0-(α-methylbenzyl-3-hydroxycrotony)-phosphate
2-chlor-1-(2,4-dichlorphenyl)vinyl-diethylphosphate (CHLORFENVINPHOS)
2-chlor-1-(2,4,5-trichlorphenyl)vinyl-dimethylphosphate
0-[2-chlor-1-(2,5-dichlorphenyl)]vinyl-0,0-diethylthiophosphate
Phenylglyoxylonitriloxim-0,0-diethylthiophosphate (PHOXIM)
0,0-diethyl-0-(3-chlor-4-methyl-2-oxo-2-H-1-benzopyran-7-yl)-thiophosphate (COUMAPHOS)
2,3-p-dioxandithiol-S,S-bis(0,0-diethyldithiosphosphate (DIOXATHION)
5-[(6-chlor-2-oxo-3-benzoxazolinyl)methyl]0,0-diethyldithio-phosphate (PHOSALONE)
2-(diethoxyphosphinylimino)-1,3-dithiolane 0,0-dimethyl-S-[2-methoxy-1,3,4-thiadiazol-5-(4H)-onyl-(4)-methyl]dithiophosphate
0,0-dimethyl-S-phthalimidomethyl-dithiophosphate (IMIDAN)
0,0-diethyl-0-(3,5,6-trichlor-2-pyridyl)thiophosphate
0,0-diethyl-0-2-pyrazinylthiophosphate (THIONAZIN)
0,0-diethyl-0-(2-isopropyl-4-methyl-6-pyrimidyl)thiophosphate (DIAZINON)
0,0-diethyl-0-(2-chinoxalyl)thiophosphate
0,0-dimethyl-S-(4-oxo-1,2,3-benzotriazin-3(4H)-ylmethyl)-dithiophosphate (AZINPHOSMETHYL)
0,0-diethyl-S-(4-oxo-1,2,3-benzotriazin-3(4H)-ylmethyl)-dithiophosphate (AZINPHOSETHYL)
S-[(4,6-diamino-s-triazin-2-yl)methyl]-0,0-dimethyldithiophosphate (MENAZON)
0,0-dimethyl-0-(3-chlor-4-nitrophenyl)thiophosphate (CHLORTHION)
0,0-dimethyl-0(or S)-2-(ethykthioethyl)thiophosphate (DEMETOX-S-METHYL)
2-(0,0-dimethyl-phosphoryl-thiomethyl)-5-methoxy-pyron-4-3,4-dichlorbenzyl-triphenylphosphoniumchloride
0,0-diethyl-S-(2,5-dichlorphenylthiomethyl)dithiophosphate (PHENKAPTON)
0,0-diethyl-0-(4-methyl-cumarinyl-7-)-thiophosphate (POTASAN)
5-amino-bis(dimethylamido)phosphinyl-3-phenyl-1,2,4-triazole (TRIAMIPHOS)
N-methyl-5-(0,0-dimethylthiolphosphoryl)-3-thiavaleramide (VAMIDOTHION)
0,0-diethyl-0-[2-dimethylamino-4-methylpyrimidyl-(6)]-thiophosphate (DIOCTHYL)
0,0-dimethyl-S-(methylcarbamoylmethyl)-thiophosphate (OMETHOATE)
0-ethyl-0-(8-quinolinyl)-phenylthiophosphonate (OXINOTHIOPHOS)
0-methyl-S-methyl-amidothiophosphate (MONITOR)
0-methyl-0-(2,5-dichlor-4-bromphenyl)-benzothiophosphate (PHOSVEL)
0,0,0,0-tetrapropyldithiophosphate
3-(dimethoxyphosphinyloxy)-N-methyl-N-methoxy-cis-crotonamide
0,0-dimethyl-S-(N-ethylcarbamoylmethyl)dithiophosphate (ETHOATE-METHYL)
0,0-diethyl-S-(N-isopropylcarbamoylmethyl)-dithiophosphate (PROTHOATE)
S-N-(1-cyano-1-methylethyl)carbamoylmethyldiethyl-thiolphosphate (CYANTHOATE)
S-(2-acetamidoethyl)-0,0-dimethyldithiophosphate
Hexamethylphosphoric acid triamide (HEMPA)
0,0-dimethyl-0-(2-chlor-4-nitrophenyl)thiophosphate (DICAPTHON)
0,0-dimethyl-0-p-cyanophenyl thiophosphate (CYANOX)
0-ethyl-0-p-cyanophenylthiophosphonate
0,0-diethyl-0-2,4-dichlorphenylthiophosphate (DICHLORFENTHION)
0,2,4-dichlorphenyl-0-methylisopropylamidothiophosphate
0,0-diethyl-0-2,5-dichlor-4-bromphenylthiophosphate (BROMOPHOS-ETHYL)
Dimethyl-p-(methylthio)phenylphosphate
0,0-dimethyl-0-p-sulfamidophenylthiophosphate
0-[p-(p-chlorphenyl)azophenyl]0,0-dimethylthiophosphate (AZOTHOATE)
0-ethyl-S-4-chlorphenyl-ethyldithiophosphate 0-isobutyl-S-p-chlorphenyl-ethyldithiophosphate
0,0-dimethyl-S-p-chlorphenylthiophosphate
0,0-dimethyl-S-(p-chlorphenylthiomethyl)dithiophosphate
0,0-diethyl-p-chlorphenylmercaptomethyl-dithiophosphate (CARBOPHENOTHION)
0,0-diethyl-S-p-chlorphenylthiomethyl-thiophosphate
0,0-dimethyl-S-(carbethoxy-phenylmethyl)dithiophosphate (PHENTHOATE)
0,0-diethyl-S-(carbofluorethoxy-phenylmethyl)-dithiophosphate
0,0-dimethyl-S-(carboisopropoxy-phenylmethyl)-dithiophosphate
0,0-diethyl-7-hydroxy-3,4-tetramethylene-coumarinyl-thiophosphate (COUMITHOATE)
2-methoxy-4-H-1,3,2-benzodioxaphosphorin-2-sulphide.
0,0-diethyl-0-(5-phenyl-3-isooxazolyl)thiophosphate
2-(diethoxyphosphinylimino)-4-methyl-1,3-dithiolane
Tris-(2-methyl-1-aziridinyl)-phosphine oxide (METEPA)
S-(2-chlor-1-phthalimidoethyl)-0,0-diethyldithiophosphate
N-hydroxynaphthalimido-diethylphosphate
Dimethyl-3,5,6-trichlor-2-pyridylphosphate
0,0-dimethyl-0-(3,5,6-trichlor-2-pyridyl)thiophosphate
S-2-(ethylsulphonyl)ethyl dimethylthiolphosphate (DIOXYDEMETON-S-METHYL)
Diethyl-S-2-(ethylsulphinyl)ethyl dithiophosphate (OXYDISULFOTON)
Bis-0,0-diethylthiophosphoric acid anhydride (SULFOTEP)
Dimethyl-1,3di(carbomethoxy)-1-propen-2-yl-phosphate
Dimethyl-(2,2,2-trichlor-1-butyroyloxyethyl)phosphate (BUTONATE)
0,0-dimethyl-0-(2,2-dichlor-1-methoxy-vinyl)phosphate
Bis-(dimethylamido)fluorphosphate (DIMEFOX)
3,4-dichlorbenzyl-triphenylphosphoniumchloride.
Dimethyl-N-methoxymethylcarbamoylmethyl-dithiophosphate (FORMOCARBAM)
0,0-diethyl-0-(2,2-dichlor-1-chlorethoxyvinyl)phosphate
0,0-dimethyl-0-(2,2-dichlor-1-chlorethoxyvinyl)phosphate
0-ethyl-S,S-diphenyldithiolphosphate
0-ethyl-S-benzyl-phenyldithiophosphonate
0,0-diethyl-S-benzyl-thiolphosphate
0,0-dimethyl-S-(4-chlorphenylthiomethyl)dithiophosphate (METHYLCARBOPHENOTHION)
0,0-dimethyl-S-(ethylthiomethyl)dithiophosphate
Diisopropylaminofluorphosphate (MIPAFOX)
0,0-dimethyl-S-(morpholinylcarbamoylmethyl)dithiophosphate (MORPHOTHION)
Bismethylamido-phenylphosphate
0,0-dimethyl-S-(benzene sulphonyl)dithiophosphate
0,0-dimethyl-(S and 0)-ethylsulphinylethylthiophosphate
0,0-diethyl-0-4-nitrophenylphosphate
Triethoxy-isopropoxy-bis(thiophosphinyl)disulphide
2-methoxy-4H-1,3,2,benzodioxaphosphorin-2-oxide
Octamethylpyrophosphoramide (SCHRADAN)
Bis (dimethoxythiophosphinylsulphido)-phenylmethane
N,N,N',N'-tetramethyldiamidofluorphosphate (DIMEFOX)

0-phenyl-0-p-nitrophenyl-methanthiophosphonate (COLEP)
0-methyl-0-(2-chlor-4-tert. butyl-phenyl)-N-methylamidothiophosphate (NARLENE)
0-ethyl-0-2(2,4-dichlorphenyl)-phenylthiophosphonate
0,0-diethyl-0-(4-methylmercapto-3,5-dimethylphenyl)-thiophosphate
4,4'-bis-(0,0-dimethylthiophosphoryloxy)-diphenyldisulphide
0,0-di-(β-chlorethyl)-0-(3-chlor-4-methyl-cumarinyl-7)-phosphate
S-(1-phthalimidoethyl)-0,0-diethyldithiophosphate
0,0-dimethyl-0-(3-chlor-4-diethylsulphamylphenyl)-thiophosphate
0-methyl-0-(2-carbisopropoxyphenyl)-amidothiophosphate
5-(0,0-dimethylphosphoryl)-6-chlor-bicyclo(3.2.0)-heptadiene (1,5)
0-methyl-0-(2-i-propoxycarbonyl-1-methylvinyl)ethylamidothiophosphate
0-methyl-0-(2-chlor-4-tert. butyl-phenyl)-N-methylamidothiophosphate (NARLENE)
0-ethyl-0-(2,4-dichlorphenyl)-phenylthiophosphonate
0,0-diethyl-0-(4-methylmercapto-3,5-dimethylphenyl)-thiophosphate
4,4'-bis-(0,0-dimethylthiophosphoryloxy)-diphenyl disulphide,
0,0-di-(β-chlorethyl)-0-(3-chlor-4-methyl-coumarinyl-7)-phosphate
S-(1-phthalimidoethyl)-0,0-diethyldithiophosphate
0,0-dimethyl-0-(3-chlor-4-diethylsulphamylphenyl)-thiophosphate
0-methyl-0-(2-carbisopropoxyphenyl)-amidothiophosphate
5-(0,0-dimethylphosphoryl)-6-chlor-bicyclo(3.2.0)-heptadiene (1,5)
0-methyl-0-(2-i-propoxycarbonyl-1-methylvinyl)-ethylamidothiophosphate.

Carbamic acid derivatives 1-naphthyl-N-methylcarbamate (CARBARYL)
2-butinyl-4-chlorophenylcarbamate
4-dimethylamino-3-tolyl-N-methylcarbamate (AMINOCARB)
4-methylthio-3,5-xylyl-N-methylcarbamate (METHIOCARB)
2-chlorophenyl-N-methylcarbamate (CPMC)
1-(dimethylcarbamoyl)-5-methyl-3-pyrazolyl-N,N-dimethylcarbamate (DIMETHILAN)
2,3-dihydro-2,2-dimethyl-7-benzofuranyl-N-methylcarbamate (CARBOFURAN)
2-methyl-2-methylthiopropional-0-(methylcarbamoyl)-oxime (ALDICARB)
8-quinaldyl-N-methylcarbamate and salts thereof
3-isopropyl-5-methylphenyl-N-methylcarbamate (PROMECARB)
2-(1,3-dioxolan-2-yl)-phenyl-N-methylcarbamate (DIOXACARB)
2-(4,5-dimethyl-1,3-dioxalan-2-yl)-phenyl-N-methylcarbamate
2-(1,3-dithiolan-2-yl)-phenyl-N-methylcarbamate
2-(1,3-dithiolan-2-yl)-phenyl-N,N-dimethylcarbamate
2-isopropoxyphenyl-N-methylcarbamate (APROCARB)
4-diallylamino-3,5-xylyl-N-methylcarbamate (ALLYXICARB)

1-isopropyl-3-methylpyrazol-5-yl-N,N-dimethylcarbamate (ISOLAN)
1-methylthioethylimino-N-methylcarbamate (METHOMYL)
2-[propargylethylamino]-phenyl-N-methylcarbamate
2-[propargylmethylamino]-phenyl-N-methylcarbamate
2-[dipropargylamino]-phenyl-N-methylcarbamate
3-methyl-4-[dipropargylamino]-phenyl-N-methylcarbamate
3,5-dimethyl-4-[dipropargylamino]-phenyl-N-methylcarbamate
2-[allylisopropylamino]-phenyl-N-methylcarbamate Nitrophenols and derivatives 4,6-dinitro-6-methylphenol, Na-salt [Dinitrocresol]
dinitrobutylphenol-(2,2',2''-triethanolamine salt
2-cyclohexyl-4,6-dinitrophenol [Dinex]
2-(1-methylheptyl)-4,6-dinitrophenyl-crotonate [Dinocap]
2-sec.-butyl-4,6-dinitrophenyl-3-methyl-butenoate [Binapacryl]
2-sec.-butyl-4,6-dinitrophenyl-cyclopropionate
2-sec.-butyl-4,6-dinitrophenylisopropylcarbonate [Dinobuton]

Miscellaneous pyrethin I
pyrethin II
3-allyl-2-methyl-4-oxo-2-cyclopenten-1-yl-chrysanthemumate (Allethrin)
6-chloriperonyl-chrysanthemumate (Barthrin)
2,4-dimethylbenzyl-chrysanthemumate (Dimethrin)
2,3,4,5-tetrahydrophthalimidomethylchrysanthemumate
4-chlorobenzyl-4-chlorophenylsulphide [Chlorbensid]
6-methyl-2-oxol,3-dithiolo-[4,5-b]-quinoxaline [Quinomethionate]
(I)-3-(2-furfuryl)-2-methyl-4-oxocyclopent-2-enyl(I)-(cis + trans)-chrysanthemum-monocarboxylate [Furethrin]
2-pivaloyl-indane-1,3-dione [Pindon]
N'-(4-chloro-2-methylphenyl)-N,N-dimethylformamidine (Chlorphenamidin)
4-chlorobenzyl-4-fluorophenyl-sulphide [Fluorbenside]
5,6-dichloro-1-phenoxycarbanyl-2-trifluoromethyl-benzimidazole (Fenozaflor)
p-chlorophenyl-p-chlorobenzenesulphonate (Ovex)
p-chlorophenyl-benzenesulphonate (Fenson)
p-chlorophenyl-2,4,5-trichlorophenylsulphone (Tetradifon)
p-chlorophenyl-2,4,5-trichlorophenylsulphide (Tetrasul)
p-chlorobenzyl-p-chlorophenylsulphide (Chlorbenside)
2-thio-1,3-dithiolo-(5-6)-quinoxaline (Thiochinox)
prop-2-ynyl-(4-t-butylphenoxy)-cyclohexylsulphite (Propargil).

Furthermore, the new compounds of formula I possess extraordinarily good nematicidal properties, and can be used, for example, for the control of the following plant-parasitic nematodes: Meloidogyne spp., Heterodera spp., Ditylenchus Pratylenchus spp., Paratylenchus spp., Anguina spp., Helicotylenchus spp., Tylenchorhynchus spp., Rotylenchulus spp., Tylenchulus semipentrans, Radopholus similis, Belonolaismus spp., Trichodorus spp., Longidorus spp., Aphelenchoides spp., Xyphinema spp..

In addition to possessing the above mentioned properties, the compounds of formula I exhibit, applied in very small amounts, a favourable degree of effectiveness against members of the class Thallophyta.

They are effective, in particular, against fungi, especially against phytopathogenic fungi belonging to the following classes, orders or species:

Oomycetes,
such as Plasmodiphora-species, Aphanomyces-species, Pythium-species, Phytophthora-species, e.g. (Phytophthora infestans, Phytophthora cactorum, Plasmopara-species, e.g., (Plasmopara viticola), Bremia-species (Bremia lactucae), Peronosporaspecies, e.g., (Peronospora tabacina), Pseudoperonospora-species, e.g., (Pseudoperonospora humuli).

Zygomycetes,
such as Rhizophus-species.

Ascomycetes,
such as Eurotiales, such as Aspergillus-species, Penicillium-species, e.g. (Penicillium digitatum, Penicillium italicum),
Taphrinales, such as Taphrina-species, e.g. (Taphrina deformans),
Erysiphales, such as Erysiphes-species, e.g. (Erysiphes Cichoracearum, Erysiphes graminis),
Podosphaera leucotricha, Sphaerotheca-species (Sphaerotheca pannosa), Uncinula-species (Uncinula necator),
Helotiales, such as monilina-species (Monilinia [Sclerotinia] fructicola, Monilinia laxa),
Diplocarpon-species (Diplocarpon rosae), Pseudopeziza-species,
Sphaeriales, such as Nectria-species (Nectria galligena),
Ceratocystis-species,
Pseudosphaeriales, such as Venturia-species, (Venturia inaequalis), Mycosphaerella-species,
Ophiobolus-species (Ophiobolus graminis),
Cochliobolus-species ([Helminthosporium] miyabeanus),
Cercospora-species (Cercospora beticola, Cercospora musae).

Basidiomycetes,
such as Aphyllophorales, Pellicularia-species, e.g. (Pellicularia filamentora = [Rhizoctonia solani]), Uredinales such as Puccinia-species, e.g. (Puccinia triticina), Uromyces-species (Uromyces phaseoli), Hemileia-species (Hemileia vastatrix), Cronartiumseries (Cronartium ribicola), Phragmidium-species (Phragmidium subcorticium), Gymnosporangium species.

Denteromycetes = (Fungi impertecti)
such as Piricularia-species, e.g. (Piricularia oryzae), Corynespora-species, Thielaviopsis-species. Clasterosporium-species, Botrytis-species (Botrytis cinerea), Cladosporium-species, Alternaria-species (Alternaria solani), Verticillium-species (Verticillium albo-atrum), Phialophora-species, Melanconiales, such as Colletotrichum-species, Fusarium-species, such as (Fusarium oxysporum, Fusarium nivale), Gloesporium-species (Gloesporium fructigenum), Sphaeropsidales, e.g. Septoria-species (Septoria apicola), Diplodia-species (Diplodia natalensis), *Mycelia sterilia*, e.g. Sclerotium series (*Sclerotium rolfsii*).

The compounds of formula I likewise have a fungitoxic action in the case of fungi which attack the plants from the soil and cause, in some cases, tracheomycose, such as, e.g. *Fusarium cubense*, *fusarium dianthi*, *Verticillium alboatrum* and Phialophora cinereceus.

Moreover, the new active substances can be used for the treatment of seeds, fruit, tubers, etc., for the protection against fungus infections, e.g. as a result of smut fungi of all kinds, such as:

Ustilaginales such as Ustilago-species (*Ustilago avenae*), Tilletia-species (*Tilletia tritici*), Urocystis- and Tuburcinia-species, Phoma-species (*Phoma betae*).

The compounds of formula I can be used on their own or together with suitable carriers and/or additives. Suitable carriers and additives may be solid or liquid, and correspond to the substances common in formulation practice, such as, e.g. natural and regenerated substances, solvents, dispersing agents, wetting agents, adhesives, thickeners, binders and/or fertilisers.

For application, the compounds of formula I can be processed into the form of dusts, emulsion concentrates, granulates, dispersions, sprays, or solutions, the formulation of these preparations being effected in a manner commonly known in practice. Also to be mentioned are cattle dips and spray races, in which aqueous preparations are used.

The agents according to the invention are produced in a manner known per se by the intimate mixing and-/or grinding of active substances of formula I with the suitable carriers, optionally with the addition of dispersing agents or solvents which are inert to the active substances. The active substances can be obtained and used in the following preparation forms:

solid preparations:
   dusts, scattering agents, granulates, coated granulates, impregnated granulates and homogeneous granulates;

liquid preparations:
a. water dispersible active substance concentrates: wettable powders, pastes, emulsions;
b. solutions.

The solid preparations (dusts, scattering agents) are produced by the mixing of the active substances with solid carriers. Suitable carriers are, e.g. kaolin, talcum, bole, loess, chalk, limestone, ground limestone, Atta-clay, dolomite, diatomaceous earth, precipitated silicic acid, alkaline-earth silicates, sodium and potassium aluminium silicates (feldspar and mica), calcium and magnesium sulphates, magnesium oxide, ground synthetic materials, fertilisers such as ammonium sulphate, ammonium phosphate, ammonium nitrate, urea, ground vegetable products such as bran, bark dust, sawdust, ground nutshells, cellulose powder, residues of plant extractions, active charcoal, etc., alone or in admixture with each other.

The particle size of the carriers is for dusts advantageously up to about 0.1 mm; for scattering agents from about 0.075 mm to 0.2 mm; and for granulates 0.2 mm or coarser.

To these mixtures may also be added additives stabilising the active substance, and/or non-ionic, anion-active and cation-active substances which, for example, improve the adhesiveness of the active substances on plants and on plants of plants (adhesives and agglutinants), and/or ensure better wettability (wetting agents) and dispersibility (dispersing agents).

The following substances are, for example, suitable: olein/lime mixture, cellulose derivatives (methyl cellulose, carboxymethyl cellulose), hydroxyethylene glycol ethers of monoalkyl and dialkyl phenols having 5 to 15 ethylene oxide radicals per molecule and 8 to 9 carbon atoms in the alkyl radical, ligninsulphonic acid, the alkali metal and alkaline-earth metal salts thereof, polyethylene glycol ethers (carbowaxes), fatty alcohol polyglycol ethers having 5 to 20 ethylene oxide radicals per molecule and 8 to 18 carbon atoms in the fatty alcohol moiety, condensation products of ethylene oxide, propylene oxide, polyvinyl-pyrrolidones, polyvinyl alcohols, condensation products of urea and formaldehyde, as well as latex products.

Water-dispersible concentrates of active substances, i.e. wettable powders, pastes and emulsion concentrates, are agents which can be diluted with water to obtain any desired concentration. They consist of active substance, carrier, optionally additives which stabilise the active substance, surface-active substances, and anti-foam agents and, optionally, solvents.

The wettable powders and pastes are obtained by the mixing and grinding of the active substances with dispersing agents and pulverulent carriers, in suitable devices, until homogeneity is obtained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of naphthalene or of naphthalene-sulphonic acids with phenol and formaldehyde, as well as alkali, ammonium and alkaline-earth metal salts of ligninsulphonic acid, also alkylarylsulphonates, alkali metal salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, ditertiary acetylene glycols, dialkyl dilauryl ammonium chloride, and fatty acid alkali-metal and alkaline-earth metal salts.

Suitable anti-foam agents are, e.g. silicones.

The active substances are so mixed, ground, sieved and strained with the above mentioned additives that the solid constituent in the case of wettable powders has a particle size not exceeding 0.02 to 0.04 mm, and in the case of pastes not exceeding 0.03 mm. For the preparation of emulsion concentrates and pastes, dispersing agents are used such as those mentioned in the preceding paragraphs, organic solvents and water. Suitable solvents are, e.g. alcohols, benzene, xylene, toluene, dimethylsulphoxide, and mineral oil fractions boiling in the range of 120° to 350°C. The solvents must be practically odourless, nonphytotoxic, and inert to the active substances.

Furthermore, the agents according to the invention can be used in the form of solutions. For this purpose, the active substance, or several active substances, of the general formula I is dissolved in suitable organic solvents, solvent mixtures, or water. As organic solvents it is possible to use aliphatic and aromatic hydrocarbons, their chlorinated derivatives, alkylnaphthalenes, mineral oils on their own or in admixture with each other.

The content of active substance in the above described agents is between 0.1 and 95 percent; it is to be mentioned in this connection that in the case of application of the agents from an aeroplane, or by means of some other suitable application devices, concentrations of up to 99.5% can be used, or even the pure active substance.

The active substances of formula I can be prepared, e.g. as follows:

Dusts:

The following substances are used for the preparation of a) a 5percent dust, and b) a 2 percent dust:
a. 5 parts of active substance
95 parts of talcum.
b. 2 parts of active substance
1 part of highly dispersed silicic acid
97 parts of talcum.

The active substances are mixed and ground with the carriers.

The following substances are used to produce a 5 percent granulate:
5 parts of active substance,
0.25 parts of epichlorhydrin,
0.25 parts of cetyl polyglycol ether,
3.50 parts of polyethylene glycol,
91 parts of kaolin (particle size 0.3 – 0.8 mm).

The active substance is mixed with epichlorhydrin and dissolved with 6 parts of acetone; the polyethylene glycol and cetyl polyglycol ether are then added. The thus obtained solution is sprayed on to kaolin, and the acetone subsequently evaporated in vacuo.

Wettable powder:

The following constituents are used for the preparation of a) a 40 percent, b) and c) a 25 percent, and d) a 10 percent wettable powder:
a. parts of active substance,
5 parts of sodium lignin sulphonate,
1 part of sodium dibutyl-naphthalene sulphonate,
54 parts of silicic acid.
b. 25 parts of active substance,
4.5 parts of calcium lignin sulphonate
1.9 parts of Champagne chalk/hydroxyethyl cellulose mixture (1:1),
1.5 parts of sodium dibutyl naphthalene sulphonate,
19.5 parts of silicic acid,
19.5 parts of Champagne chalk,
28.1 part of kaolin.
c. 25 parts of active substance,
2.5 parts of isooctylphenoxy-polyoxyethyleneethanol,
1.7 parts of Champagne chalk/hydroxyethyl cellulose mixture (1:1),
8.3 parts of sodium aluminium silicate,
16.5 parts of kieselguhr,
46 parts of kaolin.
d. 10 parts of active substance,
3 parts of a mixture of the sodium salts of saturated fatty alcohol sulphates,
5 parts of naphthalenesulphonic acid/formaldehyde condensate,
82 parts of kaolin.

The active substances are intimately mixed, in suitable mixers, with the additives, the mixture being then ground in the appropriate mills and rollers. Wettable powders are obtained which can be diluted with water to gives suspensions of any desired concentration.

Emulsifiable concentrates:

The following substances are used to produce a) a 10 percent and b) a 25 percent emulsifiable concentrate:
a. 10 parts of active substance, 3.4 parts of epoxidised vegetable oil,
13.4 parts of a combination emulsifier consisting of fatty alcohol polyglycol ether and alkylarylsulphonate calcium salt,
40 parts of dimethylformamide,
43.2 parts of xylene.
b. 25 parts of active substance,
2.5 parts of epoxidised vegetable oil,
10 parts of an alkylarylsulphonate/fatty alcoholpolyglycol ether mixture
5 parts of dimethylformamide,
57.5 parts of xylene.

From these concentrates it is possible to produce, by dilution with water, emulsions of any desired concentration.

Spray:

The following constituents are used to prepare a 5percent spray:
5 parts of active substance,
1 part of epichlorhydrin,
94 parts of benzine (boiling limits 160°–190°C).

EXAMPLE 1 a. An amount of 117 g of 1-isopropyl-semicarbazide in 300 ml of orthoformic acid ethyl ester is maintained for 3 hours at 130°C, whereby 200 ml of ethanol distil off. The solution is allowed to cool to room temperature; the precipitated product is then filtered off and recrystallised from ethyl acetate. In this manner are obtained 81 g of 1-isopropyl-3-hydroxy-1,2,4-triazole, M.P. 123°– 124°C.

| Analysis | |
|---|---|
| Calculated: | C 47.3 H 7.1 N 33.1 O 12.6% |
| Found: | C 47.2 H 7.3 N 32.8 O 12.7 | b. 5.5 g of 1-isopropyl-3-hydroxy-1,2,4-triazole, 6 g of potassium carbonate and 100 ml of methyl ethyl ketone are refluxed for one hour. The solution is allowed to cool to room temperature; an amount of 8.2 g of diethylthiophosphoric acid chloride is added dropwise, with stirring, and the solution is refluxed for a further two hours. Stirring is subsequently continued for five hours and the solution then allowed to stand overnight. The precipitated salt is filtered off, and the filtrate concentrated in vacuo. For purification, the obtained oil is chromatographed on the 20-fold amount of silica gel (0.05 – 0.2 mm), with acetone as the eluting agent. Thus obtained are 6.5 g of pure 0,0-diethyl-0-[1-isopropyl-1,2,4-triazolyl-(3)]-thiophosphoric acid ester, $n_D^{20} = 1.4853$.

| Analysis | |
|---|---|
| Calculated: | C 38.7 H 6.4 N 15.0 P 11.1 S 11.5% |
| Found: | C 38.9 H 6.5 N 14.5 P 11.0 S 11.5% |

Example 2

12.7 g of isopropyl-3-hydroxy-1,2,4-triazole, 13.8 g of potassium carbonate and 200 ml of methyl ethyl ketone are refluxed for one hour. The solution is cooled to room temperature and to it are added dropwise, with stirring, 16.1 g of dimethylthiophosphoric acid chloride in 100 ml of methyl ethyl ketone. The solution is subsequently refluxed for a further 3 hours, and stirring is continued at room temperature overnight. The precipitated salt is filtered off, and the filtrate concentrated in vacuo. To effect purification, the obtained oil is chromatographed through the 20-fold amount of silica gel (0.05 – 0.2 mm), with acetone as the eluting agent. In this way are obtained 14 g of 0,0-dimethyl-0-[1-isopropyl-1,2,4-triazolyl-(3)]-thiophosphoric acid ester, $N_D^{20} = 1.5191$.

| Analysis | |
|---|---|
| Calculated: | C 33.5 H 5.6 N 16.7 P 12.3 S 12.7% |
| Found: | C 34.2 H 5.7 N 15.8 P 11.6 S 12.4% |

| Triazolylphosphoric acid esters: | Refractive indices |
|---|---|
| | $n_D^{20}$ |
| 0,0-Dimethyl-0-[1-isopropyl-1,2,4-triazolyl-(3)]-phosphoric acid ester | 1,4940 |
| 0,0-Diethyl-0-[1-isopropyl-5-methyl-1,2,4-triazolyl-(3)]-thiophosphoric acid ester | 1,4848 |
| 0,0-Diethyl-0-[1-ethyl-1,2,4-triazolyl-(3)]-thiophosphoric acid ester | 1,4892 |
| 0,0-Diethyl-0-[1-cyclohexyl-1,2,4-triazolyl-(3)]-thiophosphoric acid ester | 1,5050 |
| 0,0-Dimethyl-0-[1-ethyl-1,2,4-triazolyl-(3)]-thiophosphoric acid ester | 1,5033 |
| 0,0-Dimethyl-0-[1-cyclohexyl-1,2,4-triazolyl-(3)]-thiophosphoric acid ester | 1,5263 |
| 0,0-Diethyl-0-[1-cyclopentyl-1,2,4-triazolyl-(3)]-thiophosphoric acid ester | 1,5030 |
| 0,0-Dimethyl-0-[1-cyclopentyl-1,2,4-triazolyl-(3)]-thiophosphoric acid ester | 1,5125 |
| 0,0-Dimethyl-0-[1-n-propyl-1,2,4-triazolyl-(3)]-thiophosphoric acid ester | 1,5113 |
| 0,0-Diethyl-0-[1-n-propyl-1,2,4-triazolyl-(3)]-thiophosphoric acid ester | 1,4839 |
| 0,0-Dimethyl-0-[1-sec.butyl-1,2,4-triazolyl-(3)]-thiophosphoric acid ester | 1,5003 |
| 0,0-Diethyl-0-[1-sec.butyl-1,2,4-triazolyl-(3)]-thiophosphoric acid ester | 1,4818 |
| 0,0-Dimethyl-0-[1-(2'-methyl-butyl)-1,2,4-triazolyl-(3)]-thiophosphoric acid ester | 1,4953 |
| 0,0-Diethyl-0-[1-(2'-methyl-butyl)-1,2,4-triazolyl-(3)]-thiophosphoric acid ester | 1,4832 |
| 0,0-Dimethyl-0-[1-n-hexyl-1,2,4-triazolyl-(3)]-thiophosphoric acid ester | 1,4917 |
| 0,0-Diethyl-0-[1-n-hexyl-1,2,4-triazolyl-(3)]-thiophosphoric acid ester | 1,4817 |
| 0,0-Dimethyl-0-[1-iso-butyl-1,2,4-triazolyl-(3)]-thiophosphoric acid ester | 1,5055 |
| 0,0-Diethyl-0-[1-iso-butyl-1,2,4-triazolyl-(3)]-thiophosphoric acid ester | 1,4832 |
| 0,0-Diethyl-0-[1-ethyl-5-phenyl-1,2,4-triazolyl-(3)]-thiophosphoric acid ester | 1,5350 |
| 0,0-Dimethyl-0-[1-ethyl-5-methyl-1,2,4-triazolyl-(3)]-thiophosphoric acid ester | 1,5097 |
| 0,0-Diethyl-0-[1-ethyl-5-methyl-1,2,4-triazolyl-(3)]-thiophosphoric acid ester | 1,4888 |
| 0,0-Dimethyl-0-[1-ethyl-1,2,4-triazolyl-(3)]-thiophosphoric acid ester | 1,4783 |
| 0,0-Dimethyl-0-[1-n-butyl-1,2,4-triazolyl-(3)]-thiophosphoric acid ester | 1,5121 |
| 0,0-Diethyl-0-[1-n-butyl-1,2,4-triazolyl-(3)]-thiophosphoric acid ester | 1,4852 |
| 0,0-Diethyl-[1-sec.pentyl-1,2,4-triazolyl-(3)]-thiophosphoric acid ester | 1,4815 |
| 0,0-Diethyl-0-[1-sec.hexyl-1,2,4-triazolyl-(3)]-thiophosphoric acid ester | 1,4786 |
| 0,0-Diethyl-0-[1-sec.neohexyl-1,2,4-triazolyl-(3)]-thiophosphoric acid ester | 1,4848 |
| 0,0-Diethyl-0-[1-(2'-ethyl-propyl)-1,2,4-triazolyl-(3)]-thiophosphoric acid ester | 1,4861 |
| 0,0-Di-n-butyl-0-[1-isopropyl-1,2,4-triazolyl-(3)]-thiophosphoric acid ester | 1,4809 |
| 0,0-Diisopropyl-0-[1-isopropyl-1,2,4-triazolyl-(3)]-thiophosphoric acid ester | 1,4795 |
| 0,0-Diethyl-0-[1-isopropyl-5-ethyl-1,2,4-triazolyl-(3)]-thiophosphoric acid ester | 1,4831 |
| 0,0-Diethyl-0-[1-isopropyl-5-isopropyl-1,2,4-triazolyl-(3)]-thiophosphoric acid ester | 1,4827 |
| 0,0-Diethyl-0-[1-methyl-5-isopropyl-1,2,4-triazolyl-(3)]-thiophosphoric acid ester | 1,5210 |
| 0,0-Diethyl-0-[1-methyl-1,2,4-triazolyl-(3)]-thiophosphoric acid ester | 1,5195 |

The following new starting materials of formula II can be produced in an analogous manner to that previously described:

| Hydroxytriazoles: | Melting points: |
|---|---|
| 1-Isopropyl-5-methyl-3-hydroxy-1,2,4-triazole | 178°–180°C |
| 1-Cyclohexyl-3-hydroxy-1,2,4-triazole | 223°–225°C |
| 1-Cyclopentyl-3-hydroxy-1,2,4-triazole | 160°–167°C |
| 1-n-Propyl-3-hydroxy-1,2,4-triazole | 110°–118°C |
| 1-Isobutyl-3-hydroxy-1,2,4-triazole | 135°–137°C |
| 1-(2'-Methyl-butyl)-3-hydroxy-1,2,4-triazole | 179°–181°C |
| 1-n-Hexyl-3-hydroxy-1,2,4-triazole | 121°–124°C |
| 1-sec-Butyl-3-hydroxy-1,2,4-triazole | 188°–189°C |
| 1-Ethyl-5-phenyl-3-hydroxy-1,2,4-triazole | 187°–189°C |
| 1-Ethyl-5-methyl-3-hydroxy-1,2,4-triazole | 100°–115°C |
| 1-n-Butyl-3-hydroxy-1,2,4-triazole | 132°–134°C |
| 1-sec.Pentyl-3-hydroxy-1,2,4-triazole | 87°– 93°C |
| 1-sec.Hexyl-3-hydroxy-1,2,4-triazole | 119°–122°C |
| 1-sec.Neohexyl-3-hydroxy-1,2,4-triazole | 177°–180°C |
| 1-(2'-Ethyl-propyl)-3-hydroxy-1,2,4-triazole | 207°C |
| 1,5-Diisopropyl-3-hydroxy-1,2,4-triazole | |
| 1-Isopropyl-5-ethyl-3-hydroxy-1,2,4-triazole | 168°–170°C |

EXAMPLE 3

Contact poison action

From acetonic active substance solutions, active substance coatings of 0.15 g and 1.5 g of active substance per square metre are applied in Petri dishes. After 1 hour, polyvalent-resistant house-flies (*Musca domestica*) are placed into the dishes.

In the following table, the times are given after which 90 to 100 percent of the flies were in dorsal position

| | 90–100 % of the flies in dorsal position after X minutes | |
|---|---|---|
| | House-flies | |
| Active substance: | 1,5 g/m² | 0,15 g/m² |
| 0,0-Diethyl-0-[1-isopropyl-1,2,4-triazolyl-(3)]-thiophosphoric acid ester | 50' | 300' |
| 0,0-Dimethyl-0-[1-isopropyl-1,2,4-triazolyl-(3)]-thiophosphoric acid ester | 40' | 90' |
| 0,0-Diethyl-0-[1-ethyl-1,2,4-triazolyl-(3)]-thiophosphoric acid ester | 60' | 120' |
| 0,0-Dimethyl-0-[1-ethyl-1,2,4-triazolyl-(3)]-thiophosphoric acid ester | 30' | 90' |
| 0,0-Diemethyl-0-[1-isopropyl-1,2,4-triazolyl-(3)]-phosphoric acid ester | 30' | 90' |
| 0,0-Dimethyl-S-(1,2-dicarbethoxy-ethyl)-dithiophosphate (Known from the German Patent 847,897) | 120' | 300' (60 %) |

EXAMPLE 4

Insecticidal stomach poison action

Tobacco, cotton and potato plants are sprayed with a 0.05 percent aqueous active substance emulsion (obtained from a 10 percent emulsifiable concentrate). After the drying of the coating, Egyptian cotton leaf worms (*Spodoptera litoralis*) are placed onto the tobacco plants, cotton stainers (*Dysdercus fasciatus*) onto the cotton plants, and Colorada beetle larvae (*Leptinotarsa decemlineata*) onto the potato plants. The test is carried out at 24′ with 60 percent relative humidity. In the following Tables 2, 3 and 4, the time in hours is given after which 100 percent of the insects were in dorsal position.

| Active substance | 100% of the insects in dorsal position after X hours — Colorada beetle larvae |
|---|---|
| O,O-Diethyl-O-[1-isopropyl-1,2,4-triazolyl-(3)]-thiophosphoric acid ester | 24 |
| O,O-Dimethyl-O-[1-isopropyl-1,2,4-triazolyl-(3)]-thiophosphoric acid ester | 5 |
| O,O-Diethyl-O-[1-cyclohexyl-1,2,4-triazolyl-(3)]-thiophosphoric acid ester | 24 |
| O,O-Diethyl-O-[1-ethyl-1,2,4-triazolyl-(3)]-thiophosphoric acid ester | 24 |
| O,O-Dimethyl-O-[1-ethyl-1,2,4-triazolyl-(3)]-thiophosphoric acid ester | 24 |
| O,O-Diethyl-O-[1-cyclopentyl-1,2,4-triazolyl-(3)]-thiophosphoric acid ester | 2 |
| O,O-Dimethyl-O-[1-cyclopentyl-1,2,4-triazolyl-(3)]-thiophosphoric acid ester | 5 |
| O,O-Dimethyl-O-[1-isopropyl-1,2,4-triazolyl-(3)]-phosphoric acid ester | 5 |
| O,O-Dimethyl-S-(1,2-dicarbethoxy-ethyl)-dithiophosphate (known from the German Patent 847,897) | no effect |
| O,O-Diethyl-O-[2-isopropyl-4-methyl-pyrimidyl-(6)]-thiophosphate (known from the German Patent 910,652) | 48 (50 %) |

| Active substance: | 100% of the insects in dorsal position after X hours — Cotton stainers |
|---|---|
| O,O-Diethyl-O-[1-isopropyl-1,2,4-triazolyl-(3)]-thiophosphoric acid ester | 5 |
| O,O-Dimethyl-O-[1-isopropyl-1,2,4-triazolyl-(3)]-thiophosphoric acid ester | 24 |
| O,O-Diethyl-O-[1-isopropyl-5-methyl-1,2,4-triazolyl-(3)]-thiophosphoric acid ester | 5 |
| O,O-Diethyl-O-[1-cyclohexyl-1,2,4-triazolyl-(3)]-thiophosphoric acid ester | 24 |
| O,O-Diethyl-O-[1-ethyl-1,2,4-triazolyl-(3)]-thiophosphoric acid ester | 24 |
| O,O-Dimethyl-O-[1-ethyl-1,2,4-triazolyl-(3)]-thiophosphoric acid ester | 24 |
| O,O-Diethyl-O-[1-cyclopentyl-1,2,4-triazolyl-(3)]-thiophosphoric acid ester | 24 |
| O,O-Dimethyl-O-[1-cyclopentyl-1,2,4-triazolyl-(3)]-thiophosphoric acid ester | 48 |
| O,O-Dimethyl-S-(1,2-dicarbethoxy-ethyl)-dithiophosphate (known from the German Patent No. 847,897) | 48 (55 %) |

| Active substance: | 100% of the insects in dorsal position after X hours — Egyptian cotton leaf worms |
|---|---|
| O,O-Diethyl-O-[1-isopropyl-1,2,4-triazolyl-(3)]-thiophosphphosphoric acid ester | 2 |
| O,O-Dimethyl-O-[1-isopropyl-1,2,4-triazolyl-(3)]-thiophosphoric acid ester | 1 |
| O,O-Diethyl-O-[1-ethyl-1,2,4-triazolyl-(3)]-thiophosphoric acid ester | 2 |
| O,O-Dimethyl-O-[1-ethyl-1,2,4-triazozyl-(3) -thiophosphoric acid ester | 2 |
| O,O-Diethyl-O-[1-cyclopentyl-1,2,4-triazolyl-(3)]-thiophosphoric O,O-Dimethyl-O-[ester | 24 |
| O,O-Dimethyl--O-[1-cyclopentyl-1,2,4-triazolyl-(3)]-thiophosphate | 5 |
| O,O-Dimethyl-O-[1-isopropyl-1,2,4-triazolyl-(3)]-phosphoric acid ester | 2 |
| O,O-Dimethyl-S-(1,2-dicarbethoxy-ethyl)-dithiophosphate (known from the German Patent No. 847,897) | 48 (60 %) |

EXAMPLE 5

Systemic insecticidal action

In order to determine the systemic action, the soil of potted bean plants is watered per 600 cm³ with 50 ml of an aqueous emulsion containing 100 ppm of active substance (the emulsion being obtained from a 10 percent emulsifiable concentrate).

Bean aphids (*Aphis fabae*) are placed after 3 days on to the parts of the plants above the soil. The insects are protected, by a special device, from the effect of contact and gas. The test is carried out at 24° with 70 percent relative humidity.

In the following Table 5, the time in days is given after which 100 percent of the insects were in dorsal position

| Active substance: | 100% of the insects in dorsal position after X days |
|---|---|
| | Bean aphids |
| 0,0-Diethyl-0-[1-isopropyl-1,2,4-triazolyl-(3)]-thiophosphoric acid ester | 1 |
| 0,0-Dimethyl-0-[1-isopropyl-1,2,4-triazolyl-(3)]-thiophosphoric acid ester | 1 |
| 0,0-Diethyl-0-[1-isopropyl-5-methyl-1,2,4-triazolyl-(3)]-thiophosphoric acid ester | 1 |
| 0,0-Diethyl-0-[1-cyclohexyl-1,2,4-triazolyl-(3)]-thiophosphoric acid ester | 1 |
| 0,0-Diethyl-0-[1-ethyl-1,2,4-triazolyl-(3)]-thiophosphoric acid ester | 1 |
| 0,0-Dimethyl-0-[1-ethyl-1,2,4-triazolyl-(3)]-thiophosphoric acid ester | 1 |
| 0,0-Dimethyl-0-[1-cyclohexyl-1,2,4-triazolyl-(3)]-thiophosphoric acid ester | 2 |
| 0,0-Dimethyl-0-[1-cyclopentyl-1,2,4-triazolyl-(3)]-thiophosphoric acid ester | 1 |
| 0,0-Diethyl-0-[1-cyclopentyl-1,2,4-triazolyl-(3)]-thiophosphoric acid ester | 1 |
| 0,0-Dimethyl-0-[1-isopropyl-1,2,4-triazolyl-(3)]-phosphoric acid ester | 1 |
| 0,0-Diethyl-0-[1-phenyl-1,2,4-triazolyl-(3)]-thiophosphoric acid ester (known from the German Patent No. 1.299.924) | 3 (50 %) |

EXAMPLE 6

Action against paddy stem borers (*Chilo suppersalis*)

The compounds are processed into the form of granules. Rice plants are planted, 6 plants to a pot, in plastic pots have a top diameter of 17 cm., and the plants grown to a height of ca. 60 cm.

Infestation with $L_1$ larvae (3–4 mm long) is carried out 2 days after application of the granules (amount applied: 8, 4, and 2 kg of active substance per hectare) to the paddy water, the larvae being placed behind the 2nd leaf of the plant. The evaluation of the results with regard to insecticidal effect is made, in each case, 10 days after application of the granules.

The following percentage figures are obtained for the degree of destruction of the insects:

| Active substance | Amount applied (kg/hectare) | Destruction % |
|---|---|---|
| 0,0-Diethyl-0-[1-isobutyl-1,2,4-triazolyl-(3)]-thiophosphoric acid ester | 8 | 100 |
| | 4 | 80 |
| | 2 | 40 |
| 0,0-Diethyl-0-[1-n-propyl-1,2,4-triazolyl-(3)]-thiophosphoric acid ester | 8 | 100 |
| | 4 | 100 |
| | 2 | 100 |
| 0,0-Diethyl-0-[1-sec.butyl- | 8 | 100 |

| | | |
|---|---|---|
| 1,2,4-triazolyl-(3)]-thiophosphoric acid ester | 4 | 100 |
| | 2 | 100 |
| 0,0-Diethyl-0-[1-ethyl-5-methyl-1,2,4-triazolyl-(3)]-thiophosphoric acid ester | 8 | 100 |
| | 4 | 100 |
| | 2 | 100 |

EXAMPLE 7

Action against soil insects (*Aulocophora femoralis*)

A soil specimen of 800 g is carefully mixed, in a mixing machine, with an emulsion of the active substances, so that applied amounts of 8 and 4 kg per hectare are obtained.

Five 8 mm long larvae of *Aulocophora femoralis* are placed into plastic containers of 1.6 decilitre capacity containing soil to which had previously been added the active substance, and in which had been planted couregette plants. An examination to assess effectiveness was made 10 days after infestation, and in cases where 80–100 percent destruction had occurred, the same soil specimen was again infested and, if necessary, the plants renewed.

Twenty days after commencement of the test, a second examination to assess the degree of effectiveness was made and, if required, a further infestation was performed.

Fourty days after the start of the test, the third control examination is carried out. This biological test is suitable for showing both the initial effect and the residual effect of a preparation when in admixture with the soil.

The following percentage figures for the levels of destruction were recorded in this test.

| Active substance | Applied amount 8 kg/hect. | Destruction % | Applied amount 4 kg/hect. | Destruction % |
|---|---|---|---|---|
| 0,0-Diethyl-0-[1-isobutyl-1,2,4-triazolyl-(3)]-thiophosphoric acid ester | 10 days 20 days 40 days | 100 100 100 | 10 days 20 days | 100 100 |
| 0,0-Diethyl-0-[1-n-propyl-1,2,4-triazolyl-(3)]-thiophosphoric acid ester | 10 days 20 days 40 days | 100 100 100 | 10 days 20 days | 100 100 |
| 0,0-Diethyl-0-[1-sec.butyl-1,2,4-triazolyl-(3)]-thiophosphoric acid ester | 10 days 20 days 40 days | 100 100 100 | 10 days 20 days | 100 100 |
| 0,0-Diethyl-0-[1-ethyl-5-methyl-1,2,4-triazolyl-(3)]-thiophosphoric acid ester | 10 days 20 days 40 days | 100 100 | 10 days 20 days | 100 100 |

EXAMPLE 8

Fungicidal action a. Action against Alternaria solani on tomatoes (Solanum Lycopersicum)

Tomatoes of the type "Lukullus" are sprayed, after 3 to 4 weeks' cultivation in a greenhouse, with the test substance in the form of a spray mixture (conc. 0.1 percent of active substance), until the plants are dripping wet; and, after the drying of the sprayed-on coating, infected with a standardised spore suspension of fungus. After 5 days in a moist atmosphere at ca. 22°C, small black infection spots develop on the leaves. The number of spots is taken as a basis of evaulation in assessing the results of the test.

| | Result |
|---|---|
| 0,0-diethyl-0-[1-cyclohexyl-1,2,4-triazolyl-(3)]-thiophosphoric acid ester | = 5–20% infestation |
| Control | = 100% infestation | b. Action against Piricularia oryzae on rice

Rice plants are cultivated in a greenhouse and prophyactically sprayed once with an aqueous spray mixture containing 0.1 percent of active substance. Two days afterwards, the thus treated plants are infected with exospores of Piricularia oryzae Bri.- and Car., and, after 5 days of incubation in a moist chamber, examined with respect to fungus infection.

| | Result |
|---|---|
| 0,0-diethyl-0-[1-n-hexyl-1,2,4-triazolyl-(3)]-thiophosphoric acid ester | = 5–20% infection |
| Control | = 100% infection |

EXAMPLE 9

Action against soil nematodes

In order to test the action against soil nematodes, the active substance is added, in the concentration stated in each case, to the soil infected with root-gall-nematodes (*Meloidogyne arenaria*), and the whole intimately mixed. In the test series A, tomato seedlings are planted immediately afterwards in the thus prepared soil; and, in the test series B, tomatoes are sown after 8 days' waiting time.

For the assessment of the neumaticidal action, the galls present on the roots are counted 28 days after planting or after sowing.

| | Evaluation |
|---|---|
| 0 = | full nematicidal action = no infestation. |
| 5 = | no nematicidal action = same infestation, as in the case of the control specimen. |
| 1–4 = | intermediate stages of infestation |

Test series A

| Active substance | Concentration: 50 ppm Nematicidal action |
|---|---|
| 0,0-Diethyl-0-[1-isopropyl-1,2,4-triazolyl-(3)]-thiophosphoric acid ester | 0 |
| 0,0-Diethyl-0-[1-isobutyl-1,2,4-triazolyl-(3)]-thiophosphoric acid ester | 0 |
| 0,0-Diethyl-0-[1-n-propyl-1,2,4-triazolyl-(3)]-thiophosphoric acid ester | 0 |
| 0,0-Diethyl-0-[1-sec.butyl-1,2,4-triazolyl-(3)]-thiophosphoric acid ester | 0 |
| 0,0-Diethyl-0-[1-(2'-methyl-butyl)-1,2,4-triazolyl-(3)]-thiophosphoric acid ester | 0 |
| Tetrahydro-3,5-dimethyl-2H-1,3,5-thiadiazine-2-thione | |

(Known from Chem. Week No. 12.4.69, p.56)

Test series B

| Active substance | Concentration 50 ppm Nematicidal action |
|---|---|
| 0,0-Diethyl-0-[1-isopropyl-1,2,4-triazolyl-(3)]-thiophosphoric acid ester | 0 |
| 0,0-Diethyl-0-[1-isobutyl-1,2,4-triazolyl-(3)]-thiophosphoric acid ester | 0 |
| 0,0-Diethyl-0-[1-n-propyl-1,2,4-triazolyl-(3)]-thiophosphoric acid ester | 0 |
| 0,0-Diethyl-0-[1-sec.butyl-1,2,4-triazolyl-(3)]-thiophosphoric acid ester | 0 |
| 0,0-Diethyl-0-[1-(2'-methyl-butyl)-1,2,4-triazolyl-(3)]-thiophosphoric acid ester | 0 |
| Tetrahydro-3,5-dimethyl-2H-1,3,5-thiadiazine-2-thione | 2 |

(Known from Chem. Week No. 12.4.69, p. 56)

We claim:

1. A compound of the formula:

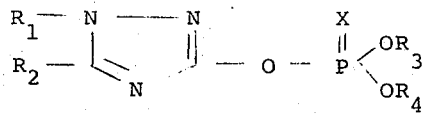

wherein $R_1$ represents a lower alkyl or cycloalkyl radical containing 3 to 6 carbon atoms, $R_2$ represents hydrogen, a lower alkyl radical, or the phenyl radical, $R_3$ and $R_4$ each represent, independently of each other, a lower alkyl radical, and X represents oxygen or sulphur.

2. A compound according to claim 1 of the formula:

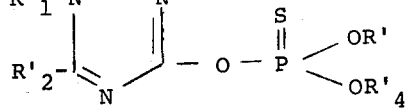

$R'_4$ represent the methyl or ethyl radical.

3. The compound according to claim 2 of the formula:

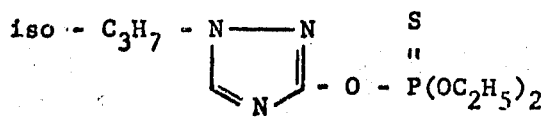

4. The compound according to claim 2 of the formula:

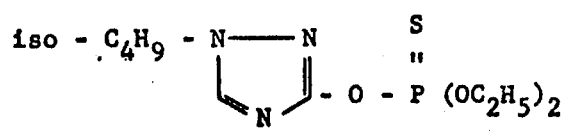

5. The compound according to claim 2 of the formula:
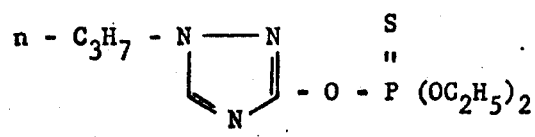
6. The compound according to claim 2 of the formula:
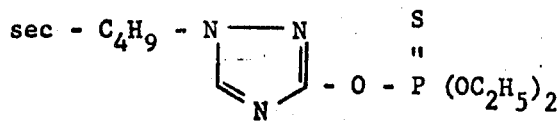
7. The compound according to claim 2 of the formula:
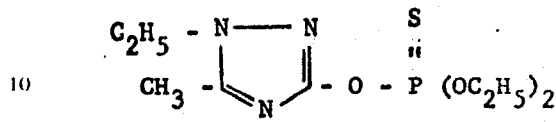
* * * * *